US012642720B2

(12) United States Patent
Eich et al.

(10) Patent No.: US 12,642,720 B2
(45) Date of Patent: Jun. 2, 2026

(54) WHEELCHAIR WHEEL

(71) Applicant: P + L Innovations GmbH, Bad Krozingen (DE)

(72) Inventors: Michael Eich, Freiburg (DE); Wolf-Dietrich Pflaumbaum, Bad Krozingen (DE)

(73) Assignee: P + L Innovations GmbH, Bad Krozingen (DE)

( * ) Notice: Subject to any disclaimer, the term of this patent is extended or adjusted under 35 U.S.C. 154(b) by 854 days.

(21) Appl. No.: 17/797,768

(22) PCT Filed: Feb. 2, 2021

(86) PCT No.: PCT/DE2021/100097
§ 371 (c)(1),
(2) Date: Aug. 5, 2022

(87) PCT Pub. No.: WO2021/155886
PCT Pub. Date: Aug. 12, 2021

(65) Prior Publication Data
US 2023/0065015 A1 Mar. 2, 2023

(30) Foreign Application Priority Data
Feb. 7, 2020 (DE) .................... 10 2020 103 171.8

(51) Int. Cl.
*A61G 5/10* (2006.01)
*B60B 3/18* (2006.01)
*B60B 25/02* (2006.01)

(52) U.S. Cl.
CPC .............. *A61G 5/1054* (2016.11); *B60B 3/18* (2013.01); *B60B 25/02* (2013.01); *B60Y 2200/84* (2013.01)

(58) Field of Classification Search
CPC .. B60B 25/02; B60B 3/00; B60B 3/02; B60B 3/14; B60B 3/18; B60C 7/08; A61G 5/1054; A61G 7/1036
See application file for complete search history.

(56) References Cited

U.S. PATENT DOCUMENTS 1,236,921 A 8/1917 Fraser
3,106,951 A 10/1963 Hurdel
(Continued)

FOREIGN PATENT DOCUMENTS

DE 10 2011 103 203 A1 12/2012
DE 10 2011 103 207 A1 12/2012
(Continued)

OTHER PUBLICATIONS

English translation of International Preliminary Report on Patentability in PCT/DE2021/100097, mailed Aug. 11, 2022.
(Continued)

*Primary Examiner* — Kip T Kotter
(74) *Attorney, Agent, or Firm* — Collard & Roe, P.C.

(57) ABSTRACT

A wheelchair wheel which is rotatable around an axis of rotation comprises includes: a hub, which can be connected to a wheel axle of a wheelchair frame; a wheel body which is arranged on the hub, forms a running surface of the wheelchair wheel and constitutes the connection between the running surface and the hub, the wheel body being composed of three wheel body segments, each wheel body segment having a rim profile and a tire portion arranged in the rim profile; three fastening devices which are independent of one another, each wheel body segment being releasably fastened to the hub by one of the fastening devices.

21 Claims, 4 Drawing Sheets

(56) References Cited

U.S. PATENT DOCUMENTS

Figures 1, 2:
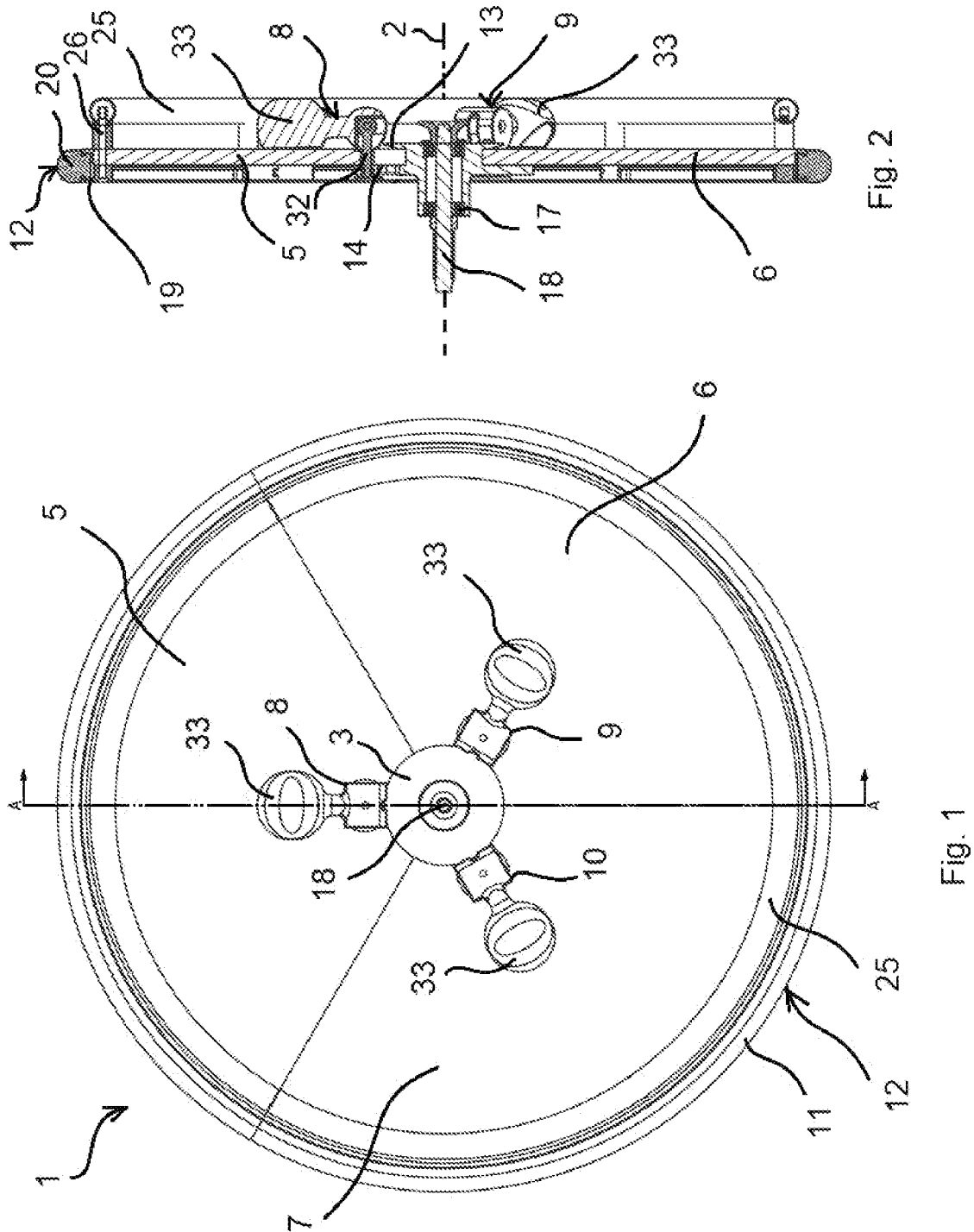

| | | | |
|---|---|---|---|
| 3,567,287 A | 3/1971 | Nutter | |
| 3,653,718 A | 4/1972 | Gellender | |
| 6,364,424 B1 | 4/2002 | Lashlee et al. | |
| 2004/0195079 A1 | 10/2004 | Webster et al. | |
| 2009/0139116 A1 | 6/2009 | Noonan et al. | |
| 2011/0140395 A1* | 6/2011 | Kigawa | A61G 5/1054 |
| | | | 280/281.1 |
| 2016/0175174 A1* | 6/2016 | Drasler | A61G 5/1054 |
| | | | 280/250.1 |
| 2019/0337333 A1* | 11/2019 | Vermeulen | B60B 1/02 |

FOREIGN PATENT DOCUMENTS

| | | | | |
|---|---|---|---|---|
| EP | 3 222 263 A1 | | 9/2017 | |
| FR | 1 504 043 A | | 12/1967 | |
| KR | 20090103357 A | * | 10/2009 | |
| KR | 20110021072 A | * | 3/2011 | |
| WO | 95/03183 A1 | | 2/1995 | |
| WO | 97/45275 A1 | | 12/1997 | |

OTHER PUBLICATIONS

German Search Report in DE 10 2020 103 171.8, dated Nov. 10, 2020, with English translation of relevant parts.
Office Action issued in Chilean Application No. 202202116, dated Oct. 26, 2023.
International Search Report in PCT/DE2021/100097, mailed Jun. 18, 2021.

* cited by examiner

WHEELCHAIR WHEEL

CROSS REFERENCE TO RELATED APPLICATIONS

This application is the National Stage of PCT/DE2021/100097 filed on Feb. 2, 2021, which claims priority under 35 U.S.C. § 119 of German Application No. 10 2020 103 171.8 filed on Feb. 7, 2020, the disclosure of which is incorporated by reference. The international application under PCT article 21 (2) was not published in English.

The invention relates to a wheelchair wheel with a hub and a wheel body arranged on the hub that forms a running surface for the wheelchair wheel and provides the connection between the hub and the running surface.

Wheelchairs are used by persons with a limited ability to walk. Typically, a wheelchair has a wheelchair frame on which a seat, two large wheelchair wheels in the form of carrying wheels and two significantly smaller front wheels are arranged. Every wheelchair wheel has a hub that can be turned relative to a wheel axle. The wheelchair wheel is arranged rotatably with the wheel axle at the wheelchair frame.

A wheelchair wheel is known from the prior art from EP 3 222 263 A1 which has a hub and a wheel body divided into three segments of identical size. The three wheel body segments are releasably fastened to the hub via a knob. To facilitate the transition from the seat of the wheelchair to a toilet, a chair or a bed for a person limited in their ability to walk, the uppermost of the three wheel body segments of the wheelchair wheel can be released from the hub. Both other wheel body segments should remain on the hub and thus on the wheelchair. All three wheel body segments are held on the hub via one single fastening device. To release one of the wheel body segments, the knob of the fastening device must be moved to a given position that frees the wheel body segment that is facing the top. This is difficult for the person sitting in the wheelchair as they can only view the knob, which is located on the side of the wheelchair, from the top. This is also true for reinstalling the wheel body segment on the wheelchair wheel as the knob must be turned in the same direction for the installation of the wheel body segment as it does for the removal. Furthermore, the common fastening device for all three wheel body segments bears the risk that the wheel body segment facing up is not released from the hub, but rather as an undesirable result one of the other two wheel body segments. In this case, the wheelchair can tip over.

The object of the invention is to provide a wheelchair wheel with three wheel body segments with which the risk of the undesired release of one or more wheel body segments is reduced and with which the targeted release of individual wheel body segments is also facilitated for persons with a limited ability to walk.

The object is achieved by a wheelchair wheel having the features of claim 1. The wheelchair wheel is characterised in that it is provided with three fastening devices that are independent of one another. Each of the three wheel body segments is releasably fastened to the hub with one of the three fastening devices. By releasing one of the three fastening devices, only that wheel body segment can be removed from the hub that is secured with precisely this fastening device. Both other fastening devices are not affected by this so that the wheel body segments fastened to the hub with these remain reliably secured to the hub.

Because exactly one fastening device is provided for each wheel body segment which is independent of the other two fastening devices, this makes it easier for the user to associate between one of the wheel body segments that they wish to remove and the corresponding fastening device.

To remove a wheel body segment from the wheelchair wheel, the fastening device with which this wheel body segment is secured to the hub is released. The fastening device is preferentially provided with a manually operated handle piece for this purpose. By operating this handle piece, the fixation of the wheel body segment on the hub is released so that the wheel body segment can be removed from the hub and from the two other wheel body segments. The user must simply choose the wheel body segment that they wish to release. For a person sitting in a wheelchair who wishes to transfer to a different seat, the selected wheel body segment is preferably adjusted on the side of the wheelchair facing the seat so as to be facing upwards. The wheelchair can be locked in the position set for this purpose by the person so that it does not roll away unintentionally and the selected wheel body segment thus remains in the set adjustment. To release the selected wheel body segment, the person operates the fastening device that corresponds to that wheel body segment. A handle piece associated with this is preferably located on the outside of the wheelchair wheel in the area of the selected wheel body segment. The association between a wheel body segment and the fastening device with which this wheel body segment is secured at the hub is thus clear and unambiguous. Releasing the selected wheel body segment with the relevant fastening device is thus clear and unambiguous, even if the user can only view the wheelchair wheel primarily from above.

It is also possible to quickly and easily install the wheel body segment into the wheelchair wheel. Here, the wheel body segment is inserted into the gap on the wheelchair wheel intended for it. As soon as the wheel body segment is positioned at the hub, it is secured using the fastening device that is arranged on the hub in the area intended for the wheel body segment.

To transport or store the wheelchair or the wheelchair wheel, all three fastening devices can also be released and the associated wheel body segments removed from the hub.

An advantage is that the three wheel body segments and the three fastening devices are identical. As a result, every wheel body segment fits in every fastening device.

According to an advantageous embodiment of the invention, the three fastening devices are arranged at the hub radially offset to the outside in relation to the axis of rotation. An advantage is that the distance between the axis of rotation and the fastening device is the same for all three fastening devices. Additionally, the angle between any two fastening devices is 120°. As a result of the arrangement of the fastening devices at a distance to the axis of rotation of the wheelchair wheel, the association between a wheel body segment arranged on the hub and a fastening device is again made easier.

According to an advantageous embodiment, each fastening device has a manually operated handle piece with which the fastening device can be brought from a closed position securing a wheel body segment to the hub into an open position releasing the wheel body segment from the hub. The handle piece is arranged here on the outside of the wheelchair wheel in the area of that wheel body segment which is secured to the hub with the relevant fastening device. To ensure that the association between a wheel body segment and the fastening device with which this wheel body segment is secured to the hub is facilitated and that a person sitting in the wheelchair can easily reach the handle piece with their hand, the handle piece is not located directly at the axis of rotation or adjacent to this in either the closed position or in the open position, but instead is radially offset to the outside at a distance to the axis of rotation.

According to a further advantageous embodiment of the invention, the hub has a circular cylindrical hub hollow part that is rotationally symmetrical in relation to a wheelchair wheel axis of rotation and which receives a wheel axle of a wheelchair frame.

According to a further advantageous embodiment of the invention, the hub has a wheel body segment seat in the form of a circumferential groove on its outside in which the wheel segments are seated with a fastening section facing the hub. The wheel body segments are positioned on the hub and aligned relative to the hub by means of this wheel body segment seat. The wheel body segment seat is also able to absorb forces acting in the axial direction on the wheelchair wheel and the wheel body segments. It can furthermore be formed to fix or clamp the wheel body segments at the hub using fastening devices.

According to a further advantageous embodiment of the invention, the wheel body segment seat is formed by two essentially parallel, ring-shaped hub discs protruding radially outwards. These two ring-shaped hub discs stand at a distance to one another in the axial direction in relation to the axis of rotation of the wheelchair wheel that essentially corresponds to the thickness of the fastening section of the wheel body segments. The thickness of the fastening section of the wheel body segments is also determined in the axial direction of the axis of rotation in this case.

According to a further advantageous embodiment of the invention, each wheel body segment has at least a partial profile on the two face ends facing the adjacent wheel body segments. The profiles of adjacent wheel body segments fastened to hub interlock here. Thanks to these interlocking profiles, the wheel body segments are held in position and cannot be shifted relative to one another in the event of forces acting in the axial direction on the wheelchair wheel. Every wheel body segment fastened to the hub is thus supported at the wheel body segment seat as well as at both wheel body segments adjacent to it.

According to a further advantageous embodiment of the invention, the profile on the one face end of each wheel body segment is in the form of a groove and on the other face end of the wheel body segment is in the form of a tongue. The wheel body segments fastened to the hub form a tongue and groove joint when connected.

According to a further advantageous embodiment of the invention, the tyre portions of all wheel body segments form a continuous tyre with an essentially cohesive running surface around its circumference. The smallest gaps or slits remain between the tyre portions of adjacent wheel body segments, however.

According to a further advantageous embodiment of the invention, each wheel body segment is provided with a hand rim section. Here, the hand rim sections of all wheel body segments fastened to the hub form a continuous, cohesive hand rim of the wheelchair wheel. The hand rim is also called a push rim. It helps the wheelchair user to move or stop the wheelchair wheels by hand. To do so, they use their hand on the hand rim. The hand rim is typically arranged on the wheelchair wheel near the rim profile.

According to a further advantageous embodiment of the invention, the hand rim sections of each two wheel body segments secured adjacent on the hub interlock so that the transition from the hand rim section of a wheel body segment to the hand rim section of the adjacent wheel body segment of the wheelchair wheel is designed without edges and injury to the wheelchair user's hand is not possible if they are using the hand rim to move or stop the wheelchair.

According to a further advantageous embodiment of the invention, the three fastening devices are identical.

According to a further advantageous embodiment of the invention, the fastening devices are in the form of clamping devices which clamp the wheel body segments to the hub.

According to a further advantageous embodiment of the invention, the fastening device is provided with an eccentric clamp.

According to a further advantageous embodiment of the invention, the eccentric clamp is self-locking. Unintentional release of the fastening device due to vibrations is thus not possible. Safe fastening of the wheel body segments at the hub is thus guaranteed.

According to a further advantageous embodiment of the invention, the eccentric clamp has a clamping lever that can be rotated around a clamping axis fixed relative to the hub. The clamping lever is equipped with the handle piece of the fastening device and with a clamping part with a clamping cam. The centre point of the clamping cam is offset to the clamping axis of the clamping lever.

According to a further advantageous embodiment of the invention, the clamping axis of the fastening devices is perpendicular to the axis of rotation of the wheelchair wheel. The clamping axis does not intersect the axis of rotation of the wheelchair wheel. Strictly speaking, a straight line parallel to the clamping axis perpendicularly intersects the axis of rotation of the wheelchair wheel. The axis of rotation of the wheelchair wheel and the clamping axis of the fastening devices are both straight lines. The clamping axes of the three fastening devices are preferably on one plane. This plane is perpendicular to the wheelchair wheel axis of rotation.

According to a further advantageous embodiment of the invention, the clamping part with the fastening device in an open position is at a distance to a wheel body segment arranged on the hub or makes contact with this with no force. With the fastening device in a closed position, the clamping part presses against a wheel body segment arranged on the hub with a force specified by the clamping cam.

According to a further advantageous embodiment of the invention, a counterbearing is arranged at the hub which, with the clamping part in a closed position, interacts with the clamping part. A wheel body segment with the fastening device in a closed position is clamped between the clamping part and the counterbearing.

According to a further advantageous embodiment of the invention, the counterbearing is formed by one of the two ring-shaped hub discs of the wheel body segment seat. The clamping part of the eccentric clamp presses a wheel body segment fastened to the hub by the fastening device against the relevant hub disc. The hub disc thus forms the counterbearing to the eccentric clamp for all three fastening devices. The hub disc remains unchanged when the fastening devices change from the closed position to the open position and vice versa. It does not affect the change from the closed position to the open position. The fastening devices in the form of clamping devices are thus independent of one another even though they are all clamped against the same counterbearing.

According to a further advantageous embodiment of the invention, each of the wheel body segments has a depression in which the clamping part lies with the fastening device in a closed position. Due to the depression, the force is increased that is required to move the fastening device from the closed position to the open position. This prevents the fastening device from unintentionally releasing due to vibrations.

According to a further advantageous embodiment of the invention, the handle piece is shaped ergonomically. The handle piece sits comfortably in one's hand. It can also be operated by persons who are limited in their ability to move.

According to a further advantageous embodiment of the invention, the handle piece on a first side has at least one handle recess for one or more fingers. On a second side of the handle piece facing away from the first side, there is a support area for a person's ball of the hand. To move the fastening device from a closed position to an open position, a person places at least one finger in the handle recess and pulls the handle piece. On the support area for the ball of the hand, the person can use the ball of the hand to exert pressure and thus move the fastening device from the open position to the closed position. It is also possible when changing from the open position to the closed position to pull the handle piece and when changing from the closed position to the open position to push the handle piece. This depends on how the handle piece is arranged at the fastening device and how the user is positioned relative to the wheelchair wheel and the relevant fastening device.

According to a further advantageous embodiment of the invention, the handle piece with the fastening device in the closed position makes contact with the wheel body segment that is fastened by this fastening device to the hub. The wheel body segment forms a stop for the closed position of the fastening device.

According to a further advantageous embodiment of the invention, each fastening device has a base arranged on the hub, parallel to the axis of rotation of the wheelchair wheel. Each wheel body segment has a recess on the fastening section facing the hub in which the base lies upon fastening the wheel body segment at the hub. The base ensures that a wheel body segment arranged at the hub cannot move in the direction of rotation of the wheelchair wheel relative to the hub. Furthermore, the base at the hub and the recess on the wheel body segments dictate the position at which a wheel body segment is arranged on the hub. This is particularly important if all three wheel body segments are removed from the hub and are to be installed again. The base can be fastened to the two ring-shaped hub discs.

According to a further advantageous embodiment of the invention, the clamping lever of the eccentric clamp is arranged rotatably at the base. The base thus forms part of the eccentric clamp, namely the part of the eccentric clamp that is fixed relative to the hub.

Further advantages and advantageous embodiments of the invention can be obtained from the following description, the drawing and the claims.

DRAWING

Figures 3, 4:
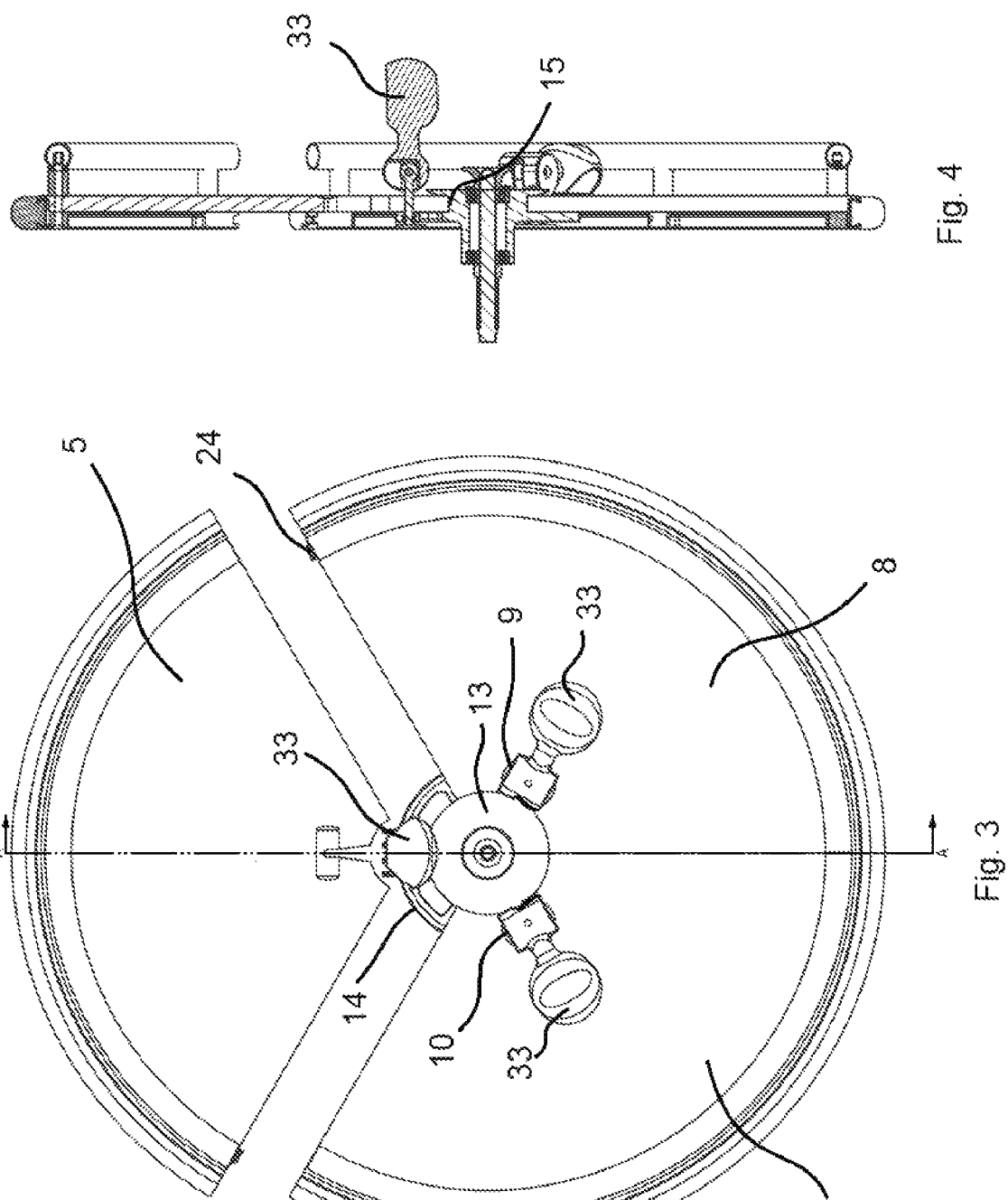
Figures 5, 6, 7, 8:
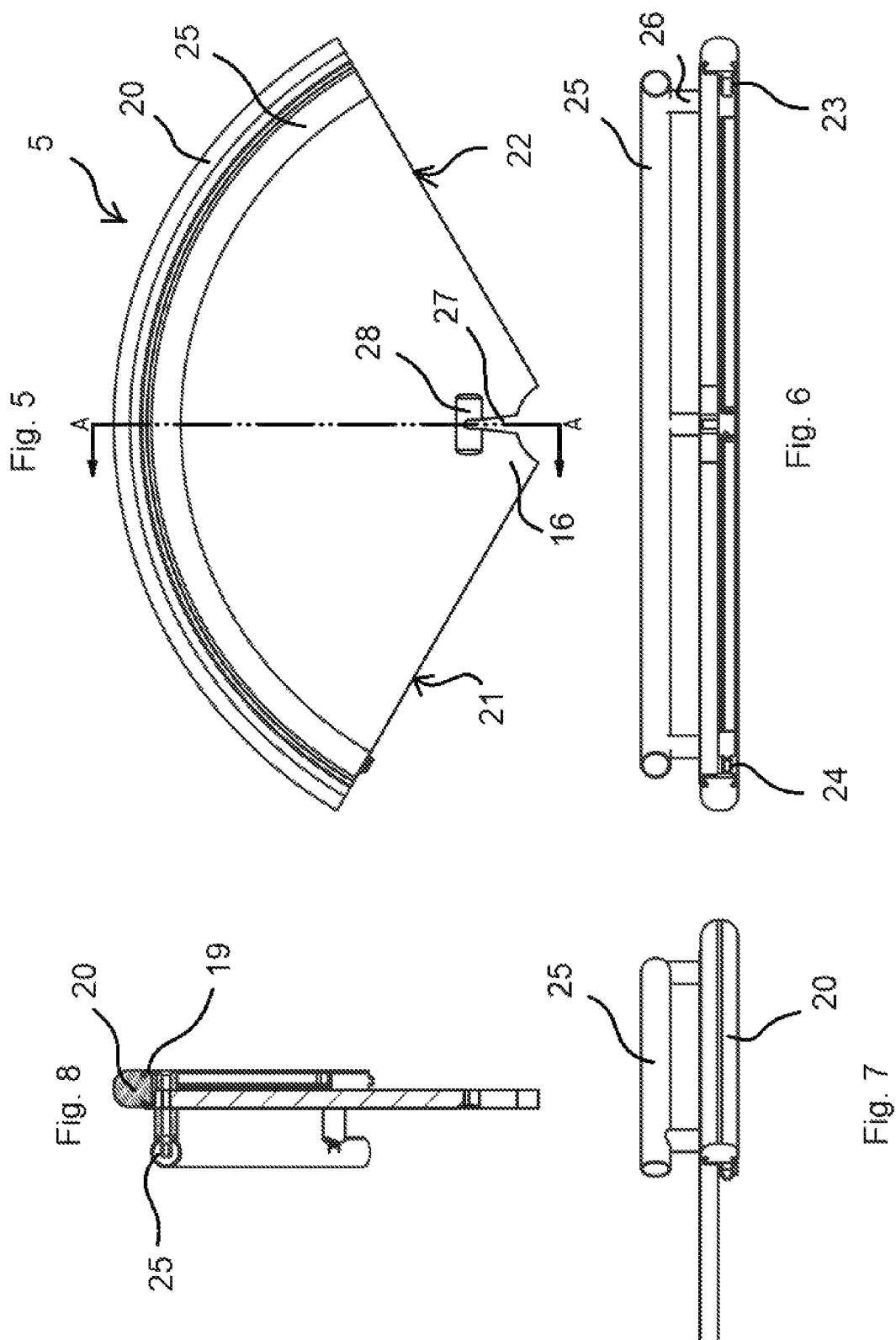
Figures 9, 10, 11:
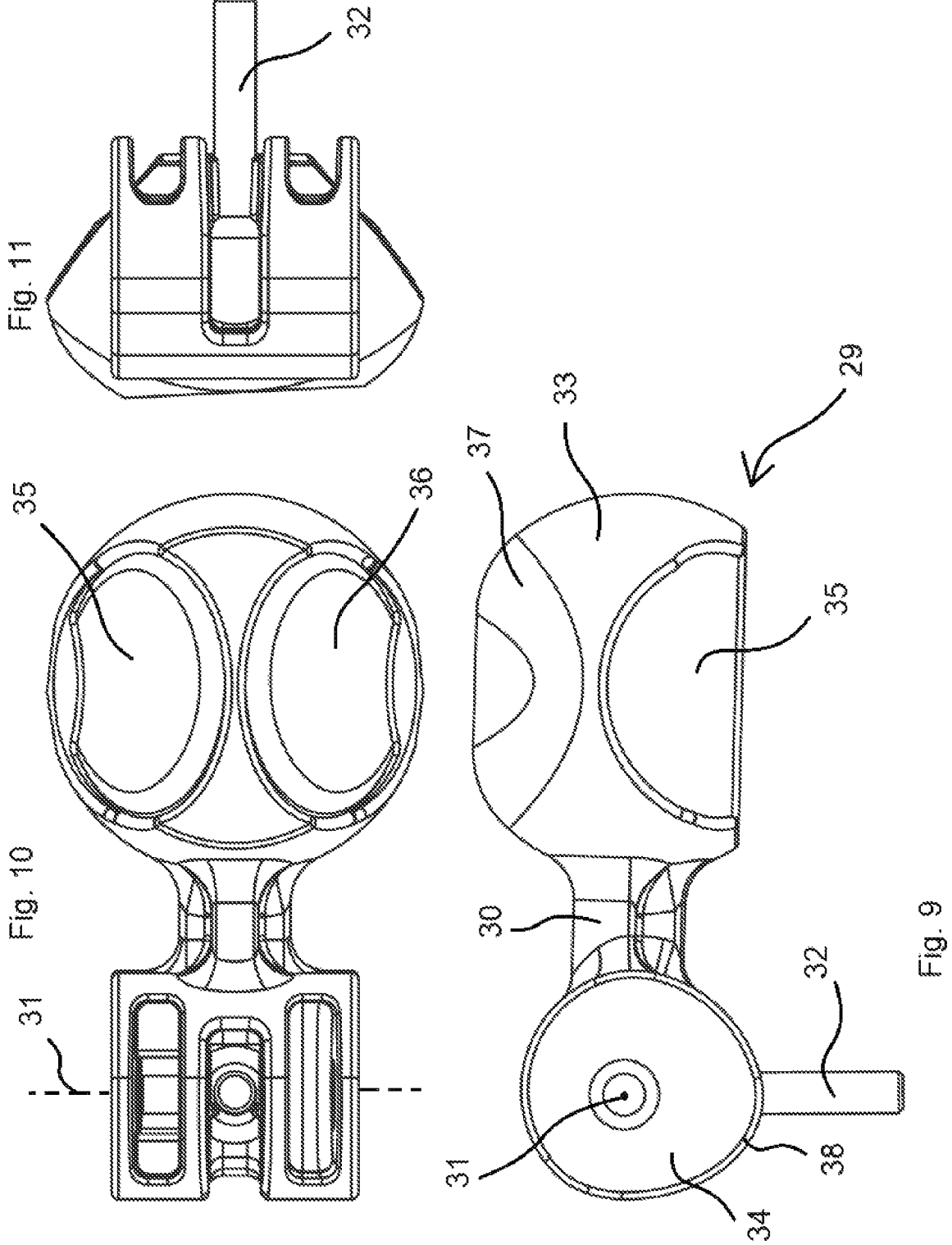

The drawing shows a model embodiment of a wheelchair wheel according to the invention. Illustrations:

FIG. 1 Wheelchair wheel in a side view,

FIG. 2 Cross-section through the wheelchair wheel according to FIG. 1 along the level designated with A-A in FIG. 1, FIG. 3 Wheelchair wheel according to FIG. 1 on which one wheel body segment is removed from the hub, FIG. 4 Cross-section through the wheelchair wheel according to FIG. 3 along the level designated with A-A in FIG. 3, FIG. 5 Wheel body segment of the wheelchair wheel according to FIG. 1 in a top view, FIG. 6 Wheel body segment according to FIG. 5 in a view from below, FIG. 7 Wheel body segment according to FIG. 5 in a side view, FIG. 8 Cross-section through wheel body segment according to FIG. 5 along the level designated with A-A in FIG. 5, FIG. 9 Eccentric clamp of a fastening device of the wheelchair wheel according to FIG. 1 in a side view, FIG. 10 Eccentric clamp according to FIG. 9 in a different side view, FIG. 11 Eccentric clamp according to FIG. 9 in a view from below.

DESCRIPTION OF THE MODEL EMBODIMENT

FIGS. 1 to 4 show a wheelchair wheel 1 which is rotatable around an axis of rotation 2. The axis of rotation 2 is a straight line. The wheelchair wheel is a rotationally symmetrical body in relation to the axis of rotation 2. The wheelchair wheel 1 has a hub 3 and a wheel body arranged at the hub 3 which is composed of three identical wheel body segments 5, 6, 7. Three independent and identical fastening devices 8, 9, 10 are arranged at the hub 3. With each of the three fastening devices 8, 9, 10 precisely one wheel body segment 5, 6, 7 can be fastened to the hub 3. It is immaterial here which of the three wheel body segments 5, 6, 7 is fastened to the hub 3 with which of the three fastening devices 8, 9, 10. FIGS. 5 to 8 show an example of the wheel body segment 5. An example of the fastening device 8 is shown in the FIGS. 9 and 11.

The wheel body has a tyre 11 on its circumference that forms a running surface 12 of the wheelchair wheel 1 around the outside. With this running surface the wheelchair wheel rolls along the ground, which is not shown in the drawing. The wheel body also establishes the connection between the hub 3 and the running surface 12.

The hub 3 has a first hub disc 13 and a second hub disc 14. Both of these hub discs 13, 14 are coaxially arranged to the axis of rotation 2 at a distance to one another. The first hub disc 13 and the second hub disc 14 form the boundary of a groove in which the wheel body segments 5, 6, 7 are inserted. The groove thus forms a wheel body segment seat 15 at the hub 3. The wheel body segments 5, 6, 7 are arranged with a fastening section 16 facing the hub 3 in the wheel body segment seat 15. On the second hub disc 14 the three fastening devices 8, 9, 10 are arranged with a spacing of 120° each. The hub 3 is also provided with ball bearings 17 in which a wheel axle 18 is mounted. Using the wheel axle 18, the wheelchair wheel 1 can be connected to a wheelchair not shown in the drawing.

Each of the three wheel body segments 5, 6, 7 extends over an angle of 120° and makes up a section of a full circle. The wheel body segments 5, 6, 7 have a rim profile 19 and a tyre portion 20 arranged in the rim profile 19. The tyre portion 20 comprises an elastic material, primarily solid rubber. The tyre portions 20 of the three wheel body segments 5, 6, 7 together form the tyre 11, whose running surface 12 is a cohesive surface with the exception of the transitions between the individual tyre portions 20.

The wheel body segments 5, 6, 7 are spokeless. They are equipped with a disc made out of carbon-fibre-reinforced plastic (CFRP). If the three wheel body segments 5, 6, 7 are fastened to the hub 3, the respective adjacent wheel body segments 5, 6, 7 make contact at their face ends 21, 22. Each wheel body segment 5, 6, 7 is provided with a groove 23 on a first face end 21 and on a second face end 22 with a tongue 24 that protrudes past the face end 22. Using the groove 23 and the tongue 24, wheel body segments 5, 6, 7 arranged on the hub 3 form a tongue and groove joint when connected.

Each of the wheel body segments 5, 6, 7 is provided with a hand rim section 25. If the three wheel body segments 5, 6, 7 are fastened to the hub, the hand rim sections 25 of adjacent wheel body segments 5, 6, 7 make contact, creating a cohesive hand rim of the wheelchair wheel 1. The hand rim section 25 is fastened at the wheel body segment 5, 6, 7 via hand rim bases 26.

In the area of the fastening section 16, the wheel body segments 5, 6, 7 have a recess 27 for a fastening device 8, 9, 10. The recess 27 runs essentially radial in relation to the axis of rotation 2 of the wheelchair wheel 1. Each wheel body segment is additionally equipped with a depression 28 in the form of a hollow for the fastening device.

The three identical fastening devices 8, 9, 10 are in the form of clamping devices with an eccentric clamp 29. This is represented in FIGS. 9, 10 and 11. The eccentric clamp 29 has a clamping lever 30 which is rotatable around a clamping axis 31. The clamping axis 31 is a straight line here which runs parallel to a straight line that perpendicularly intersects the wheel axle 2. The clamping axis 31 is in a fixed position in relation to the hub 3. It does not change its position at the hub 3. The clamping lever 30 is arranged rotatably at a base 32. The base is in the form of a pin and extends essentially parallel to the axis of rotation 2 of the wheelchair wheel 1. At one end, the base 32 is fastened to the second hub disc 14. The clamping lever 30 has a handle piece 33 and a clamping part 34. The outer contour of the clamping part 34 is a clamping cam, the centre of which is offset to the clamping axis 31. This creates a lobe 38. In the area of the lobe 38, the clamping part 34 has the greatest expansion in the radial direction in relation to the clamping axis 31. The handle piece 33 is shaped ergonomically. It has on a first side two handle recesses 35, 36 and on a second side facing away from the first side a support area 37 for the ball of the thumb.

The fastening devices 8, 9, 10 have an open position and a closed position. On the wheelchair wheel 1 shown in FIGS. 1 and 2, all three fastening devices 8, 9, 10 are in the closed position. The three wheel body segments 5, 6, 7 are arranged on the hub 3 and fastened to the hub by means of the fastening devices 8, 9, 10. The wheel body segment 5, 6, 7 are seated with their fastening sections 16 in the wheel body segment seat 15 in the form of a groove at the hub 3 and held between the first and second hub disc 13, 14. At the face ends of the wheel body segments 5, 6, 7, the wheel body segments are held together by a tongue and groove joint. In the closed position, the handle pieces 33 of the fastening devices 8, 9, 10 make contact with the wheel body segments 5, 6, 7. The lobes 38 of the eccentric clamps are arranged in the depressions 28 of the wheel body segments 5, 6, 7 and press the wheel body segments against the second hub disc 14 so that the second hub disc 14 forms a counterbearing to the eccentric clamp 29. Every wheel body segment 5, 6, 7 is clamped between the second hub disc 14 and the eccentric clamp 29 of a fastening device 8, 9, 10.

On the wheelchair wheel 1 according to FIGS. 3 and 4, the fastening device 8 is in the open position. The wheel body segment 5 is released from the hub 3 and arranged at a distance to this as well as the other two wheel body segments 6, 7. To change from the closed position to the open position, the clamping lever 30 of the eccentric clamp is turned around the clamping axis 31. The handle piece 33 moves from a position primarily in contact with the wheel body segment 5 into a position protruding vertically outwards in the direction of the wheel axis 2. This is especially discernible in FIG. 4. To move the clamping lever 30 from the closed position to the open position using the handle piece 33, pressure is applied from above on the support area 37 with the hand. The association between the fastening device 8 and the wheel body segment 5 is clearly and unambiguously dictated here for the user in that the handle piece 33 of the fastening device 8 makes contact with the wheel body segment 5. When changing from the closed position to the open position, the clamping part 34 is moved relative to the wheel body segment 5 so that the lobe 38 no longer presses against the wheel body segment 5. With the loss of this clamping force, the wheel body segment 5 now only lies loosely in the wheel body segment seat 15 and is only loosely held against the adjacent wheel body segments 6, 7 by the tongue 23 and groove 24. It can now be removed from the hub 3 without great effort.

To then fasten the wheel body segment 5 at the hub 3 again, the wheel body segment 5 is inserted with its fastening section 16 in the wheel body segment seat 15 so that the base 32 of the fastening device 8 lies in the recess 27 of the wheel body segment 5. In this position of the wheel body segment 5, its face ends touch the face ends of the adjacent wheel body segments 6, 7 and form a tongue and groove joint with these so that the wheel body segment 5 is once again loosely held at the hub 3 and supported by the two adjacent wheel body segments 6, 7. The clamping lever 30 of the fastening device 8 is now moved into the closed position using the handle piece 33. The association between the handle piece 33 of the fastening device 8 and the wheel body segment 5 to be fastened is once again clear and unambiguous for the user as the handle piece 33 of the fastening device 8 protrudes outward from the hub 3 while the handle pieces 33 of the two other fastening devices 9, 10 make contact with the wheel body segments 6, 7. This is particularly discernible in FIGS. 3 and 4. When changing from the open position to the closed position, the clamping part 34 is turned around the clamping axis 31 so that the lobe 38 once again lies in the depression 28 of the wheel body segment 5. The lobe arranged in the depression cannot disengage from the depression by itself. The eccentric clamp is self-locking.

All features of the invention can be material to the invention both on their own and in any combination.

REFERENCE NUMBERS

1 Wheelchair wheel
2 Axis of rotation
3 Hub
4
5 Wheel body segment
6 Wheel body segment
7 Wheel body segment
8 Fastening device
9 Fastening device
10 Fastening device
11 Tyre
12 Running surface
13 First hub disc
14 Second hub disc
15 Wheel body segment seat
16 Fastening sector
17 Ball bearing
18 Wheel axle

19 Rim profile
20 Tyre portion
21 First face end
22 Second face end
23 Groove
24 Tongue
25 Hand rim section
26 Hand rim base
27 Recess
28 Depression
29 Eccentric clamp
30 Clamping lever
31 Clamping axis
32 Base
33 Handle piece
34 Clamping part
35 Handle recess
36 Handle recess
37 Support area
38 Lobe

The invention claimed is:

1. A wheelchair wheel, which is rotatable around an axis of rotation, the wheelchair wheel comprising:

a hub, which can be connected to a wheel axle of a wheelchair frame;

a wheel body which is arranged on the hub and forms a running surface of the wheelchair wheel and constitutes a connection between the running surface and the hub, the wheel body being composed of three wheel body segments, each wheel body segment of the three wheel body segments having a rim profile and a tire portion arranged in the rim profile; and three fastening devices which are independent of one another, wherein each wheel body segment of the three wheel body segments is releasably fastened to the hub by a respective fastening device of the three fastening devices, wherein the hub has a wheel body segment seat in the form of a circumferential groove on a radial outer side of the hub, and wherein the three wheel body segments are seated in the wheel body segment seat with a fastening section facing the hub.

2. The wheelchair wheel according to claim 1, wherein the three fastening devices are arranged at the hub radially offset to an outside of the wheelchair wheel in relation to the axis of rotation of the wheelchair wheel.

3. The wheelchair wheel according to claim 1, wherein each fastening device of the three fastening devices has a manually operable handle piece with which the respective fastening device can be transferred from a closed position securing a respective wheel body segment of the three wheel body segments to the hub into an open position releasing the respective wheel body segment from the hub, and wherein the handle piece is arranged on an axially outer side of the wheelchair wheel in an area of the respective wheel body segment which is secured to the hub by the respective fastening device.

4. The wheelchair wheel according to claim 3, wherein the handle piece on a first side has at least one handle recess for one or more fingers and on a second side facing away from the first side has a support area for a person's ball of the thumb.

5. The wheelchair wheel according to claim 3, wherein the handle piece with the fastening device in a closed position makes contact with that wheel body segment that is fastened by this fastening device to the hub, and wherein the wheel body segment thereby forms a stop for the handle piece.

6. The wheelchair wheel according to claim 1, wherein the wheel body segment seat is formed by two essentially parallel, ring-shaped hub discs protruding radially outwards, which stand at a distance to one another in the axial direction in relation to the axis of rotation of the wheelchair wheel that essentially corresponds to the thickness of the fastening section of the wheel body segments.

7. The wheelchair wheel according to claim 1, wherein each wheel body segment of the three wheel body segments comprises a first face end, a second face end, a first profile on the first face end and a second profile on the second face end, wherein a respective first face end of a first wheel body segment of the three wheel body segments faces a respective second face end of an adjacent wheel body segment of the three wheel body segments and a respective first profile of the first wheel body segment of the three wheel body segments engages in a respective second profile of the adjacent wheel body segment of the three wheel body segments when the wheel body segments are fastened to the hub.

8. The wheelchair wheel according to claim 1, wherein the tire portions of the three wheel body segments form a continuous tire with an essentially cohesive running surface around a circumference of the continuous tire.

9. The wheelchair wheel according to claim 1, wherein each wheel body segment of the three wheel body segments comprises a respective hand rim section, and wherein the hand rim sections of the three wheel body segments when fastened to the hub form a continuous, cohesive hand rim of the wheelchair wheel.

10. The wheelchair wheel according to claim 1, wherein the three fastening devices are identical.

11. The wheelchair wheel according to claim 1, wherein the three fastening devices comprise clamping devices which clamp the three wheel body segments to the hub.

12. The wheelchair wheel according to claim 11, wherein each fastening device of the three fastening devices comprises an eccentric clamp.

13. The wheelchair wheel according to claim 12, wherein the eccentric clamp is self-locking.

14. The wheelchair wheel according to claim 12, wherein each fastening device of the three fastening devices has a manually operable handle piece with which the respective fastening device can be transferred from a closed position securing a respective wheel body segment of the three wheel body segments to the hub into an open position releasing the respective wheel body segment from the hub, wherein the handle piece is arranged on an axially outer side of the wheelchair wheel in an area of the respective wheel body segment which is secured to the hub by the respective fastening device, wherein the eccentric clamp has a clamping lever that can be rotated around a clamping axis fixed at the hub, and wherein the clamping lever comprises the manually operable handle piece and a clamping part that has a clamping cam.

15. The wheelchair wheel according to claim 14, wherein the clamping axis is perpendicular to the axis of rotation of the wheelchair wheel.

16. The wheelchair wheel according to claim 14, wherein, in an open position of the fastening device, the clamping part is at a distance to a wheel body segment of the three wheel body segments arranged on the hub or makes contact with the wheel body segment without force, and wherein in a closed position of the fastening device, the clamping part presses against the wheel body segment arranged on the hub with a force specified by the clamping cam.

17. The wheelchair wheel according to claim 16, wherein a counterbearing is arranged at the hub which interacts with the clamping part in the closed position of the fastening device, and wherein the wheel body segment is clamped between the clamping part and the counterbearing in the closed position of the fastening device.

18. The wheelchair wheel according to claim 17, wherein the hub has a wheel body segment seat in the form of a circumferential groove on a radial outer side of the hub, wherein the wheel body segment seat is formed by two essentially parallel, ring-shaped hub discs protruding radially outwards, and wherein the counterbearing is formed by one of the two ring-shaped hub discs.

19. The wheelchair wheel according to claim 18, wherein each of the three wheel body segments has a depression in which the clamping part comes to rest in the closed position of the fastening device.

20. The wheelchair wheel according to claim 14, wherein each fastening device has a base arranged on the hub, parallel to the axis of rotation of the wheelchair wheel, and wherein each wheel body segment has a recess on the fastening section facing the hub in which the base lies upon fastening the wheel body segment at the hub, and wherein the clamping lever of the eccentric clamp is arranged rotatably on the base.

21. The wheelchair wheel according to claim 1, wherein each fastening device has a base arranged on the hub, parallel to the axis of rotation of the wheelchair wheel, and wherein each wheel body segment has a recess on the fastening section facing the hub in which the base lies upon fastening the wheel body segment at the hub.

\* \* \* \* \*